(12) United States Patent
Vandenheede et al.

(10) Patent No.: US 11,833,935 B2
(45) Date of Patent: Dec. 5, 2023

(54) SLIDE LOCK STRUCTURE FOR SLIDE RAIL DEVICE

(71) Applicant: TS TECH CO., LTD., Asaka (JP)

(72) Inventors: Dean C. Vandenheede, Franklin, MI (US); Justin Schrand, Ferndale, MI (US); Andrew J. Simms, Royal Oak, MI (US)

(73) Assignee: TS TECH CO., LTD., Asaka (JP)

(*) Notice: Subject to any disclaimer, the term of this patent is extended or adjusted under 35 U.S.C. 154(b) by 0 days.

(21) Appl. No.: 17/761,309

(22) PCT Filed: Dec. 18, 2020

(86) PCT No.: PCT/JP2020/047519
§ 371 (c)(1),
(2) Date: Mar. 17, 2022

(87) PCT Pub. No.: WO2021/125343
PCT Pub. Date: Jun. 24, 2021

(65) Prior Publication Data
US 2022/0340051 A1     Oct. 27, 2022

Related U.S. Application Data

(60) Provisional application No. 62/951,573, filed on Dec. 20, 2019, provisional application No. 62/951,595, filed on Dec. 20, 2019.

(51) Int. Cl.
*B60N 2/08* (2006.01)

(52) U.S. Cl.
CPC ..................................... *B60N 2/08* (2013.01)

(58) Field of Classification Search
CPC ........ B60N 2/08; B60N 2/067; B60N 2/0232; B60N 2/065; B60N 2/2209; B60N 2002/0236; B60N 2002/024
(Continued)

(56) References Cited

U.S. PATENT DOCUMENTS

| | | | |
|---|---|---|---|
| 11,161,431 B2 * | 11/2021 | Kircher | B60N 2/0881 |
| 2008/0163717 A1 * | 7/2008 | Weber | B60N 2/0705 |
| | | | 74/527 |

(Continued)

FOREIGN PATENT DOCUMENTS

| | | |
|---|---|---|
| DE | 4237808 | 5/1994 |
| JP | 63-192138 | 12/1988 |

(Continued)

OTHER PUBLICATIONS

PCT International Search Report (w/ English translation) for corresponding Application No. PCT/JP2020/047519, dated Mar. 23, 2021, 6 pages.

*Primary Examiner* — Nkeisha Smith
(74) *Attorney, Agent, or Firm* — Dority & Manning, PA

(57) ABSTRACT

Provided is a slide lock structure for a slide rail device which can produce a reliable locked state with a high and reliable mechanical strength by using a simple structure. The slide lock structure includes a casing, a pair of lock members provided on the casing, and each provided with a cam surface formed on an outer side thereof, and engagement projections projecting laterally outward so as to be laterally movable between an engaged position in which the engagement projections are received in the slots, and a disengaged position in which the engagement projections are dislodged from the slots, a compression coil spring urging the lock members toward the engaged position, and an operating member provided on the casing in a movable manner, and provided with a cooperating cam surface slidably engaging the cam surface such that the lock members are moved to the disengaged position against a biasing force of the compression coil spring as the operating member is moved vertically.

11 Claims, 13 Drawing Sheets

(58) Field of Classification Search
USPC .................................................. 248/429, 430
See application file for complete search history.

(56) References Cited

U.S. PATENT DOCUMENTS

| | | | | |
|---|---|---|---|---|
| 2010/0276561 | A1* | 11/2010 | Zacharias | B60N 2/0806 248/429 |
| 2012/0001049 | A1* | 1/2012 | Selbold | B60N 2/085 403/83 |
| 2018/0126878 | A1 | 5/2018 | Yamada et al. | |

FOREIGN PATENT DOCUMENTS

| | | |
|---|---|---|
| JP | 2010-120575 | 6/2010 |
| JP | 2018-075947 | 5/2018 |
| JP | 2019-137126 | 8/2019 |

\* cited by examiner

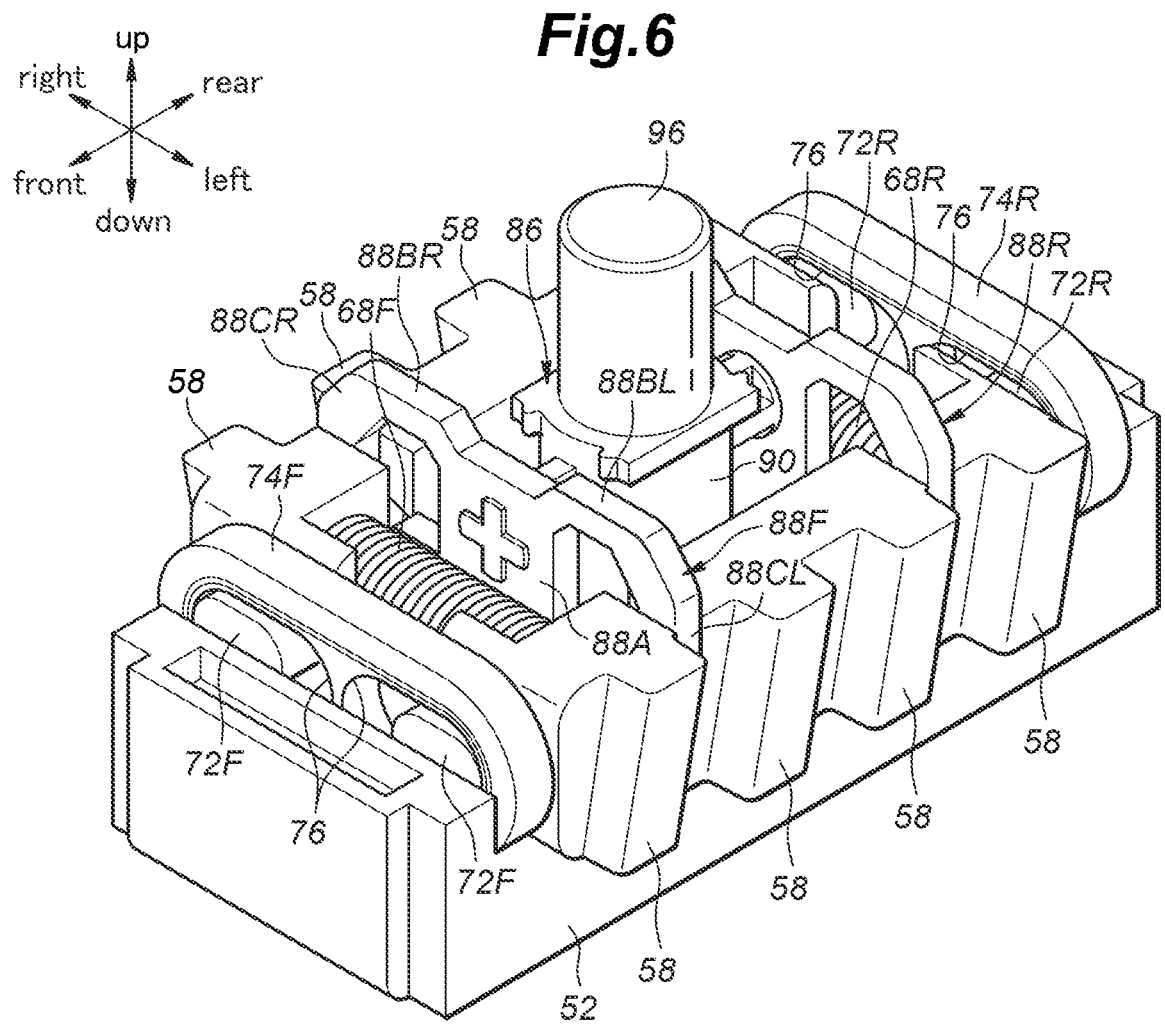

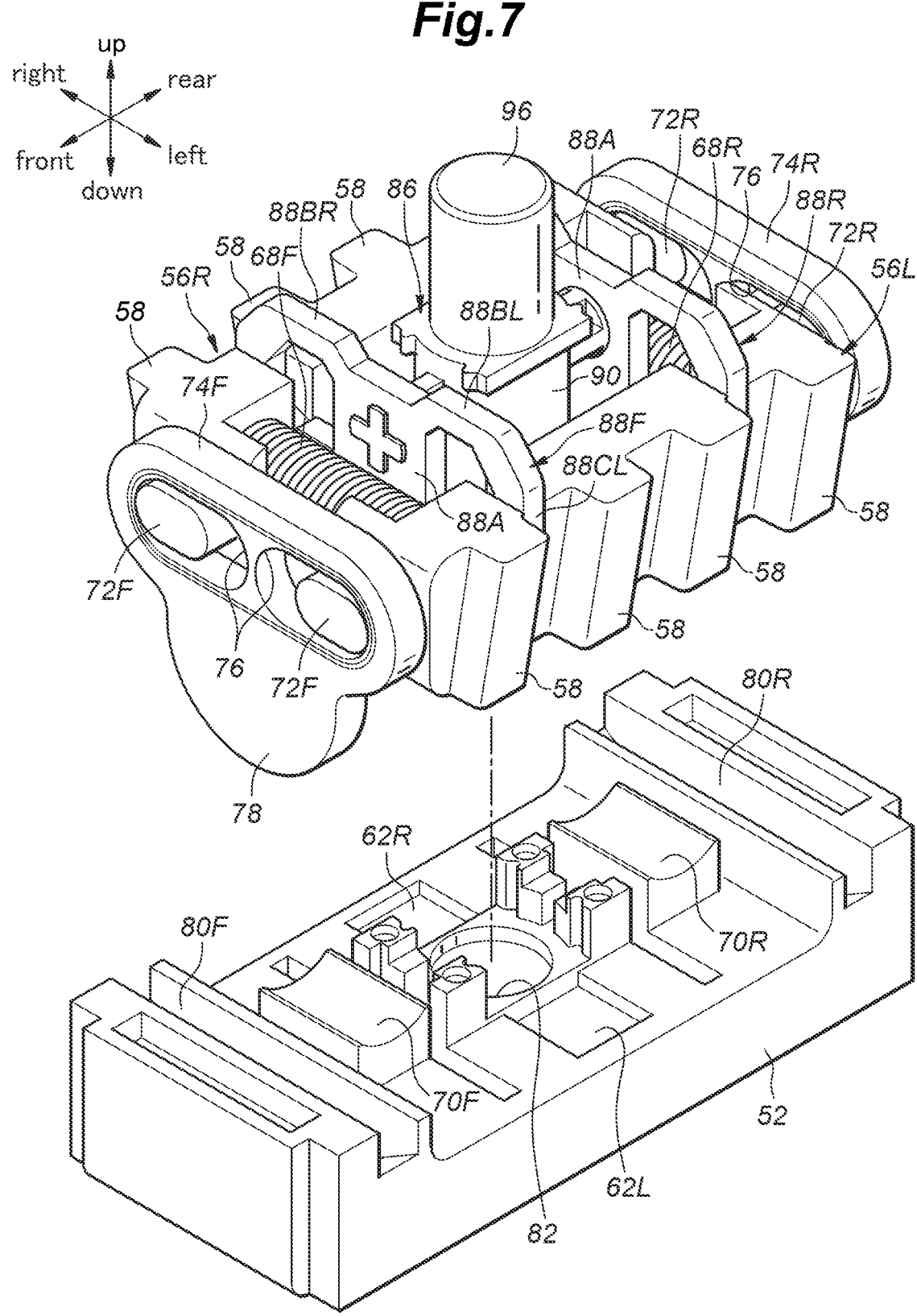

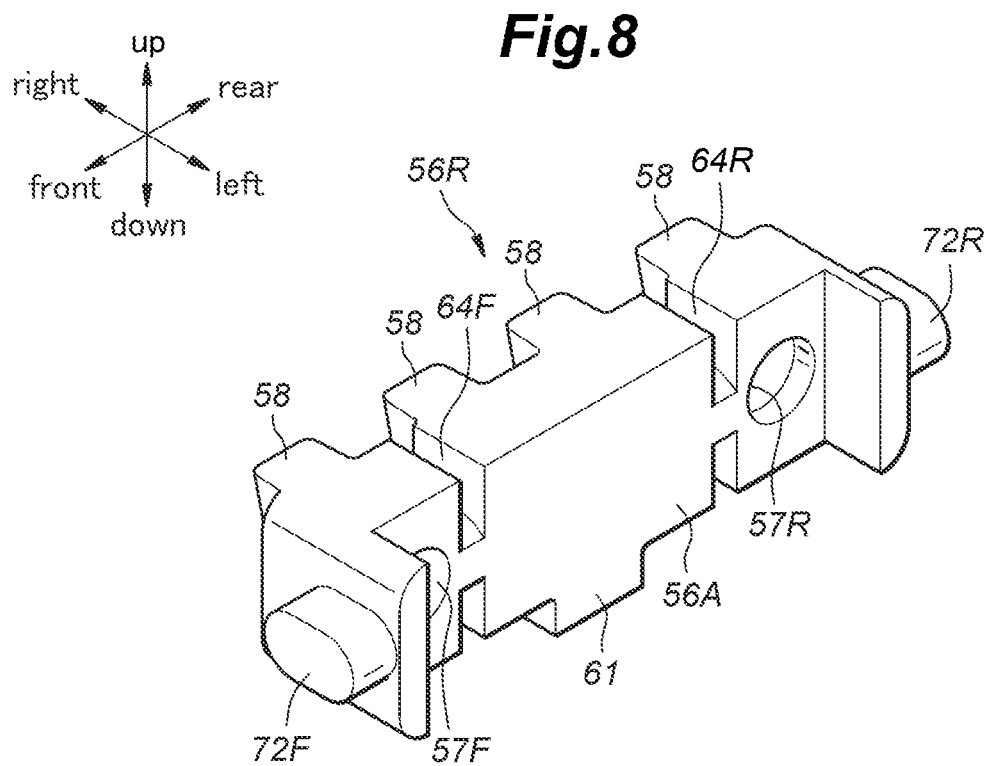

SLIDE LOCK STRUCTURE FOR SLIDE RAIL DEVICE

TECHNICAL FIELD

The present invention relates to a slide lock structure for a slide rail device.

BACKGROUND ART

A known slide lock structure for a slide rail device for use in an automotive seat device or the like creates a locked state by engaging an engagement claw of a lever rotatably supported by the slider with rack teeth or recesses formed in the lower rail. See Patent Documents 1 and 2, for instance.

PRIOR ART DOCUMENT(S)

Patent Document(s)

Patent Document 1: JP2018-75947A
Patent Document 2: JP2019-137126A

SUMMARY OF THE INVENTION

Task to be Accomplished by the Invention

According to the conventional slide lock structure, it is difficult to achieve both a simple structure and a reliable locked state with high mechanical strength.

In view of such a problem of the prior art, a primary object of the present invention is to provide a slide lock structure for a slide rail device which can produce a reliable locked state with a high and reliable mechanical strength by using a simple structure.

The slide lock structure (10) for a slide rail device (14) according to the present invention includes a linear rail (24) extending in a lengthwise direction, and having a channel cross section including a first side wall (36) and a second side wall (36) that are separated from and oppose each other in a lateral direction, each side wall being provided with a plurality of slots (40) arranged along the lengthwise direction thereof, and a slider (26) slidably engaging the linear rail, the slide lock structure (10), comprising: a casing (50) attached to the slider and including a part located between the first side wall and the second side wall; a first lock member (56) and a second lock member (56) each provided on the casing, and provided with a cam surface (66) formed on an outer side thereof, and at least one engagement projection (58) projecting laterally outward, the at least one engagement projection being laterally movable between an engaged position in which the at least one engagement projection is received in one of the slots, and a disengaged position in which the at least one engagement projection is dislodged from the slots; a first biasing member (68) urging the first lock member and the second lock member toward the engaged position; and an operating member (86) provided on the casing in a movable manner, and provided with a cooperating cam surface (94) slidably engaging the cam surface such that the first lock member and the second lock member are moved to the disengaged position against a biasing force of the first biasing member as the operating member is moved in a prescribed direction.

Thereby, a reliable locked state with a high mechanical strength can be obtained with a simple structure. Further, the slide lock structure can be formed as a single module so that the assembling of the slide lock structure to the slide rail device can be facilitated.

Preferably, the slide lock structure according to an embodiment of the present invention further comprises a second biasing member (92) urging the operating member upward relative to the casing, wherein the operating member is movable in a downward direction against a biasing force of the second biasing member, and wherein the cam surface includes an inclined outer surface inclining outward from an upper end thereof toward a lower end thereof, and the cooperating cam surface includes an inclined inner surface inclining outward from an upper end thereof toward a lower end thereof so that the first lock member and the second lock member are caused to move to the disengaged position against a biasing force of the first biasing member as the operating member is pushed downward.

Thereby, the first lock member and the second lock member can be reliably displaced to the disengaged position with a simple structure.

Preferably, the at least one engagement projection of each of the first lock member and the second lock member includes a plurality of engagement projections arranged with an interval in the lengthwise direction which is an integer multiple of an interval between the adjacent slots.

Thereby, the multiple engagement projections are moved into the corresponding slots so that a highly reliable locked state can be obtained.

Preferably, the inclined outer surface of each of the first lock member and the second lock member includes a pair of inclined outer surfaces arranged one behind the other in the lengthwise direction in a mutually spaced relationship, and the inclined inner surface of the operating member includes two pairs of inclined inner surfaces corresponding to the respective inclined outer surfaces.

Thereby, the cam surface and the cooperating cam surface can jointly cause the first lock member and the second lock member to be displaced to the disengaged position in a reliable manner.

Preferably, the inclined outer surfaces of the first lock member and the second lock member are each provided on a bottom surface of a groove (64) defined between the corresponding two adjoining engagement projections, and the inclined inner surfaces are formed on inner end surfaces of each of a pair of plate members (88) that are received in the corresponding grooves in a vertically movable manner.

Thereby, the attitude of the plate members and the attitude of the cooperating cam surfaces are kept stable so that the cam surfaces and the cooperating cam surfaces are able to displace the first lock member and the second lock member to the disengaged position in reliable manner.

Preferably, the first lock member and the second lock members are provided with inner surfaces (56A) opposing each other, and the first biasing member includes a compression coil spring (68) interposed between the opposing inner surfaces so as to be adjacent to the corresponding plate members from outside or inside in the lengthwise direction.

Thereby, the biasing force of the compression coil spring applied to the first lock member and the second lock member can be stabilized so that the attitude of the plate members can be stabilized.

Preferably, the operating member includes a rod member (96) projecting upward in an intermediate part of the operating member between the two plate members in the lengthwise direction so as to be configured to be pressed from outside.

Thereby, the load applied to the operating member is prevented from becoming uneven along the lengthwise direction so that the vertical movement of the operating member can be effected in a highly smooth manner.

Preferably, the second biasing member includes a compression coil spring interposed between the casing and the intermediate part of the operating member.

Thereby, the spring force of the compression coil spring is prevented from acting unevenly on the operating member with respect to the lengthwise direction thereof so that the vertical movement of the operating member can be effected in a highly smooth manner.

Preferably, each of the first lock member and the second lock member is provided with a protrusion (61) in a bottom part thereof, and the casing is provided with a pair of recesses (62) for receiving the projections, respectively, in a laterally slidable manner.

Thereby, the linear lateral movement of the first lock member and the second lock member can be made more reliable.

Preferably, the casing is provided with a restricting portion (72, 74) that limits an outward movement of the first lock member and the second lock member relative to the casing.

Thereby, the first lock member, the second lock member, and the compression coil spring are formed as a single subassembly that can be efficiently assembled to the casing.

Preferably, the locking structure further includes a pair of restricting plate members detachably retained to the casing in front of and behind the first lock member and the second lock member, a laterally elongated slot (76) formed in each plate member, and four protrusions (72) projecting in the lengthwise direction from end surfaces of the first lock member and the second lock member and received by the corresponding laterally elongated slots.

Thereby, the restricting portions can be formed by a small number of parts, and the first lock member, the second lock member, and the compression coil spring are formed as a single subassembly that can be efficiently assembled to the casing.

Preferably, the slots in the linear rail each form a part of a female thread, and the engagement projections each form a part of a male thread configured to thread with the female thread.

Thereby, the rail can be used also for an electric slide rail device using a motor-driven male screw member or worm that engages with the slots.

Effect of the Invention

The slide lock structure according to the present invention thus provides a reliable locked state with high mechanical strength by using a simple structure.

BRIEF DESCRIPTION OF THE DRAWING(S)

FIG. 6 is a perspective view of the slide lock device of the present embodiment with the upper case thereof removed;

FIG. 7 is an exploded perspective view of an essential part of the slide lock device of the present embodiment;

FIG. 8 is a perspective view of a lock member (a right lock member) included in the slide lock device of the present embodiment;

DESCRIPTION OF THE PREFERRED EMBODIMENT(S)

Preferred embodiments of the present invention are described in the following with reference to the appended drawings. In the following description, members that come in a pair will be denoted by reference signs consisting of the same number with respective suffixes such as L or R when it is necessary to distinguish them from each other, but may be collectively denoted by the same reference sign (number) without a suffix when it is not necessary to distinguish them from each other.

Figure 1:
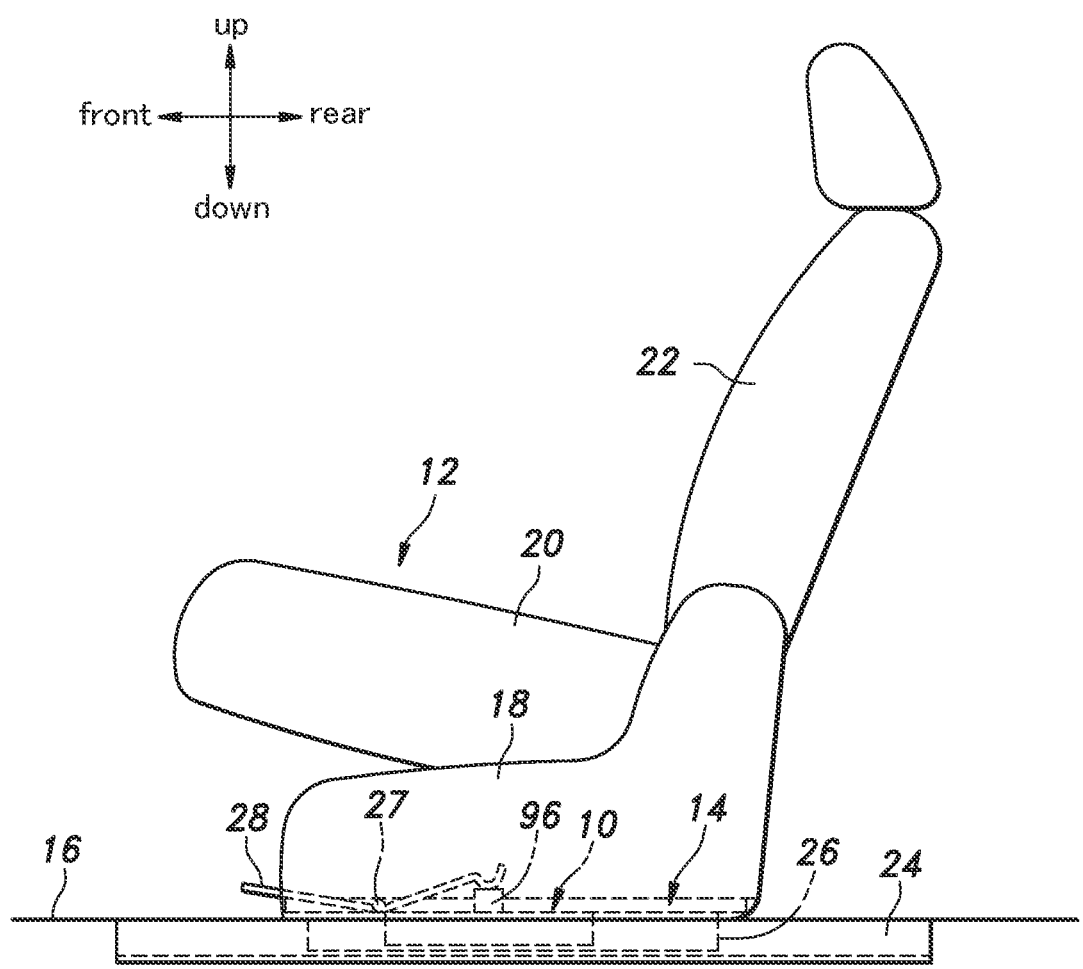
FIG. 1 is a simplified side view of a slide lock device according to an embodiment of the present invention as applied to a seat slide device of an automotive seat device.

FIG. 1 shows an example in which the slide lock structure 10 according to an embodiment of the present embodiment is applied to a slide rail device 14 for a fore and aft slide adjustment of a seat device 12 of an automobile.

The seat device 12 is mounted on a floor panel 16 of an automobile. The seat device 12 includes a base member 18, a seat cushion 20 mounted on the base member 18 to support the buttocks of the occupant, and a seatback 22 extending upward from a rear part of the seat cushion 20 to support the back of the occupant.

A pair of slide rail devices 14 are provided in parallel with each other along the left and right sides of the seat device 12. Each slide rail device 14 is provided with a linear rail 24 fixed to the lower surface of the floor panel 16 and extending in the fore and aft direction, and a slider 26 that is slidably engaged with the rail 24 so as to be slidable in the fore and aft direction.

Each slider 26 is fixed to the bottom of the base member 18. Thus, the seat device 12 can be moved in the fore and aft direction by the slide rail devices 14.

Figure 2:
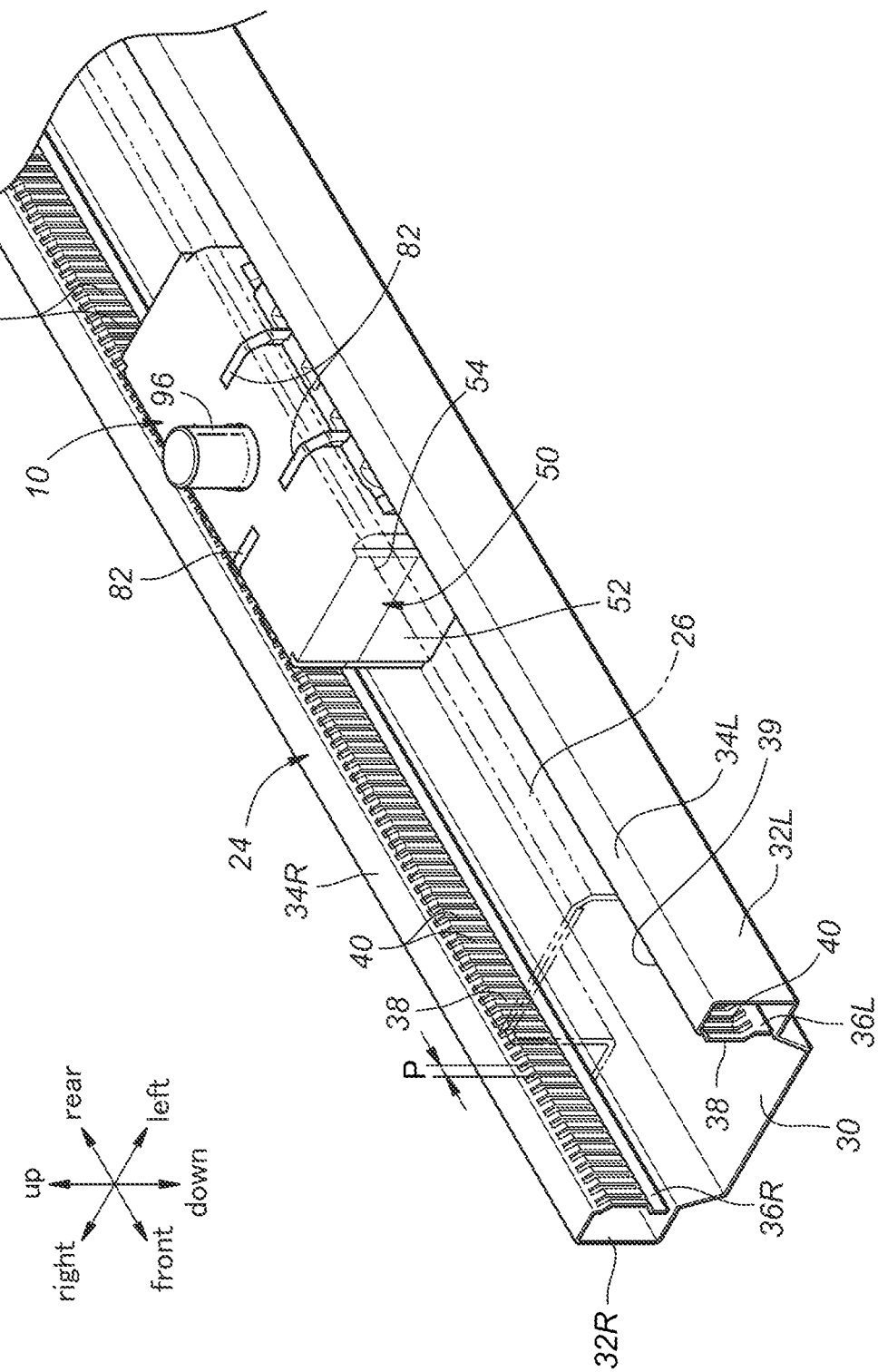
FIG. 2 is a perspective view of the slide rail device provided with the slide lock device of the present embodiment.
Figure 3:
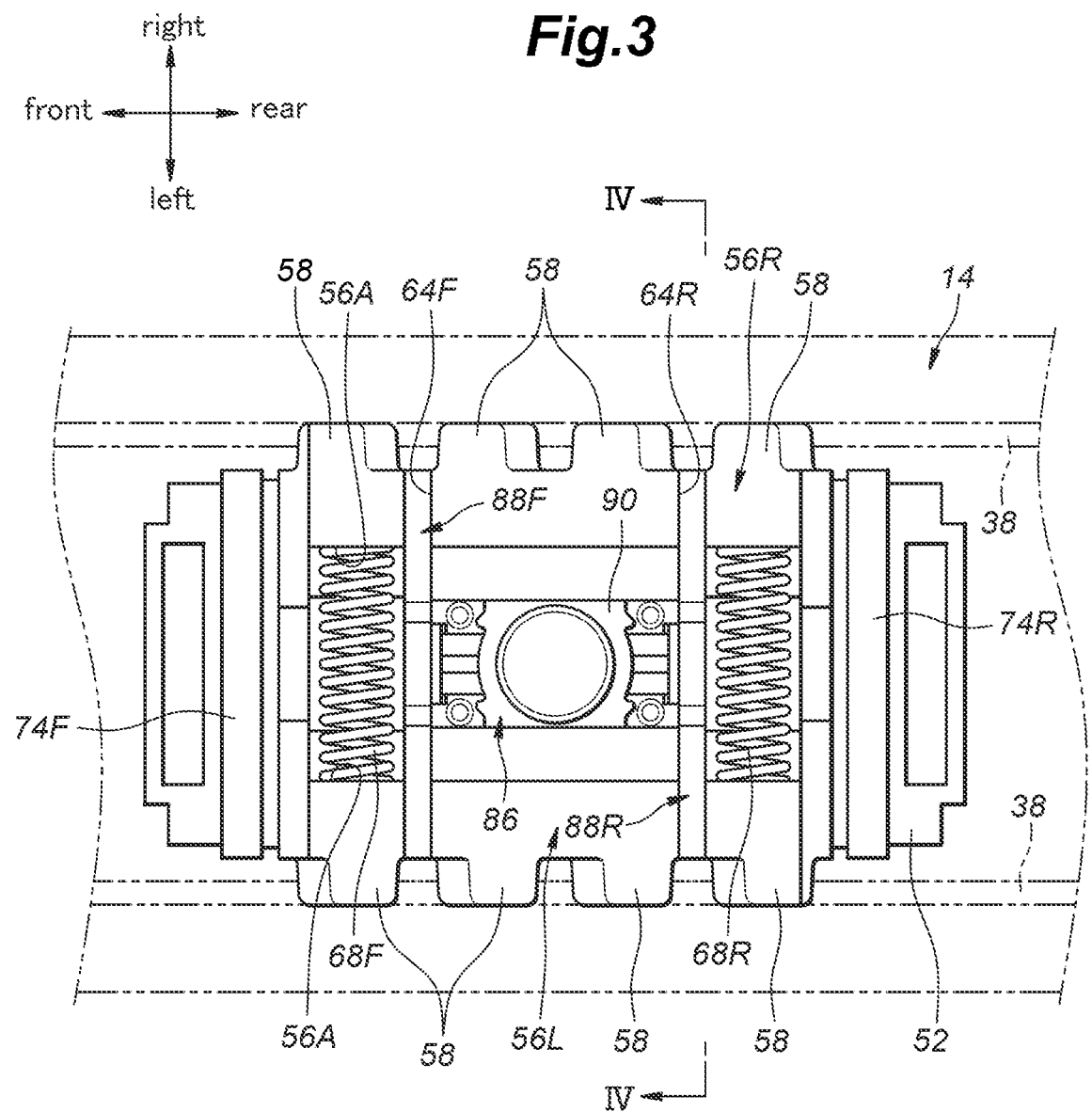
FIG. 3 is a plan view of the slide lock device of the present embodiment with an upper case thereof removed.
Figure 4:
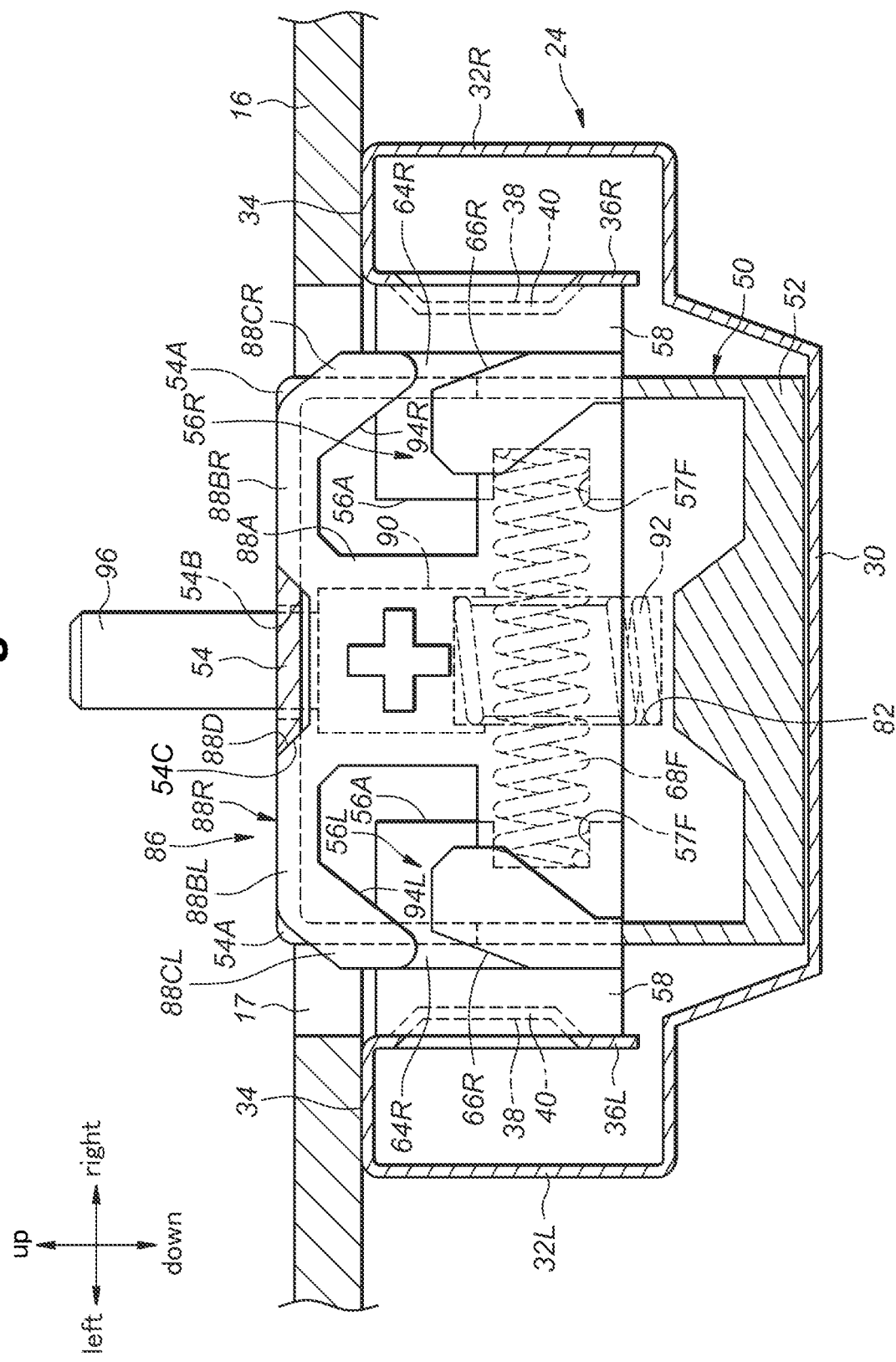
FIG. 4 is a sectional view (taken along line IV-IV of FIG. 3) of the slide lock device of the present embodiment.
Figure 5:
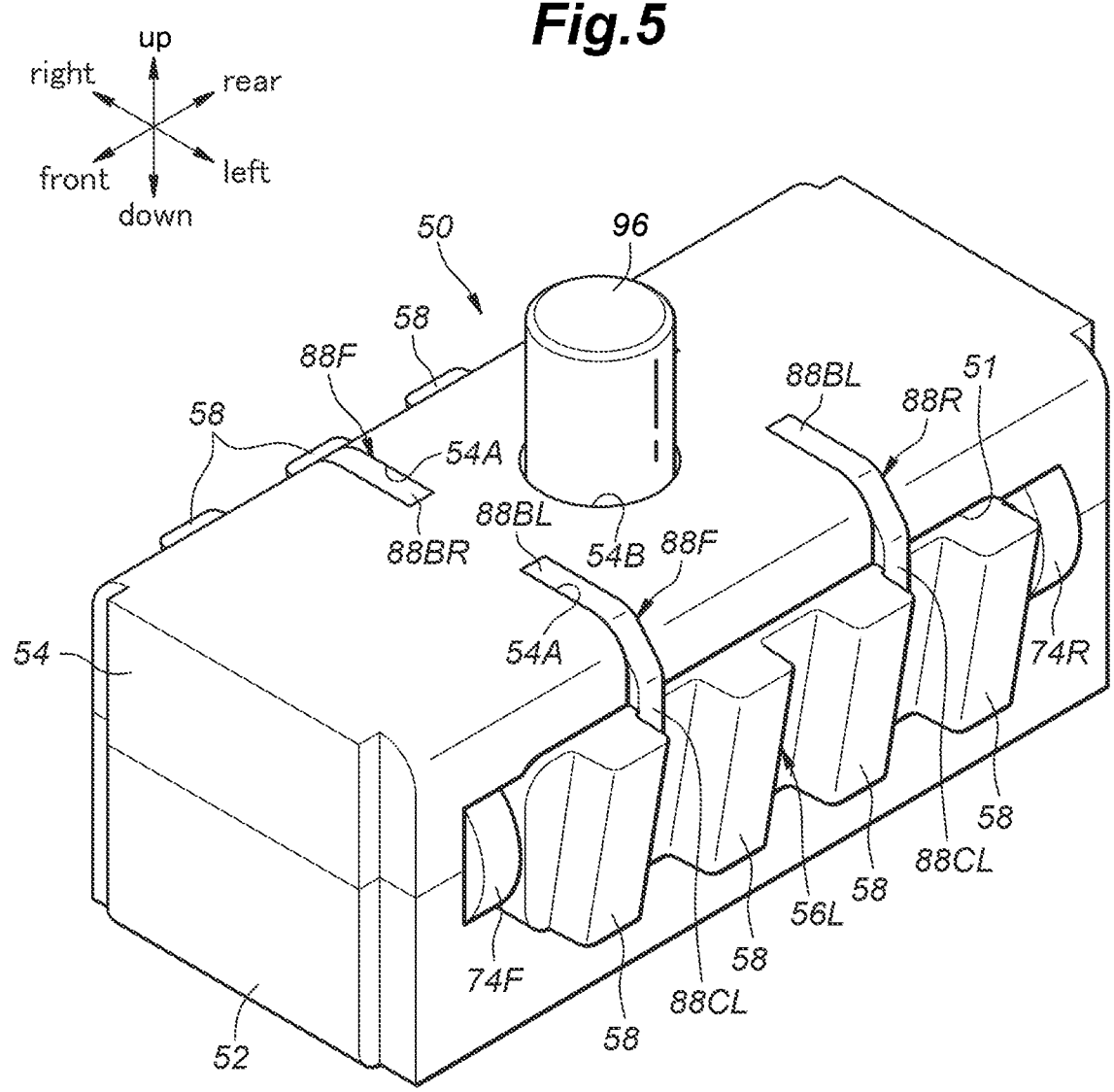
FIG. 5 is a perspective view of the slide lock device of the present embodiment.

As shown in FIG. 2, the rail 24 includes a bottom wall 30, a pair of left and right outer side walls 32L, 32R extending upright from either side edge of the bottom wall 30, a pair of left and right upper walls 34L, 34R extending toward each other from the upper edges of the respective outer side walls 32L, 32R, and a pair of left and right inner side walls 36L, 36R (a first side wall and a second side wall) extending downward from the inner edges of the respective upper walls 34L, 34R. The rail 24 thus has a channel-shaped cross section having an open upper end and extending linearly in the lengthwise direction thereof (in the fore and aft direction). An opening 39 defined by the left and right inner side walls 36L, 36R vertically aligns with a slot 17 formed in the floor panel 16 as shown in FIG. 4.

The left and right inner side walls 36L, 36R are laterally spaced from each other so as to oppose each other, and may be referred to as the first inner side wall and the second inner side wall. Each inner side wall 36 is provided with a protrusion 38 protruding toward that of the other side wall 36. A plurality of slots 40 are formed in each of the protrusions 38 at predetermined intervals along the lengthwise direction, or in other words, at a predetermined pitch P. Each slot 40 is vertically elongated, and is inclined relative to the vertical direction at a lead angle $\alpha$ (see FIG. 9), and elongated in the vertical direction. As a result, the slots 40 define a female thread group formed by the plurality of slots 40 jointly forming a part of a female thread, or teeth of a worm wheel developed in a plane.

The slide lock structure 10 is configured to releasably lock the slider 26 to the rail 24 at a desired position in the fore and aft direction. In other words, the slide lock structure 10 fixes the seat device 12, which is the object of the slide lock, at a desired position in the fore and aft direction on the floor panel 16.

In the following, the details of the slide lock structure 10 will be described with reference to FIGS. 2 to 8. The slide lock structure 10 is provided with a rectangular parallelepiped casing 50 which is formed by a lower case 52 and an upper case 54, and elongated in the fore and aft direction. The casing 50 is fixed to the slider 26 (see FIG. 1), and most of the casing 50 is located within the left and right inner side walls 36L, 36R in side view.

The casing 50 receives a pair of lock members 56L, 56R (first lock member and second lock member) laterally next to each other so as to be immobile in the fore and aft direction and the vertical direction, but movable in the lateral direction.

Each lock member 56 is provided with a plurality of engagement projections 58 protruding laterally outward from the laterally outer side surface thereof. The engagement projections 58 on each lock member 56 are provided at the same interval or an integer multiple of the intervals (pitch P) of the slots 40, and inclined with respect to the vertical direction by the same angle as the lead angle $\alpha$. The engagement projections 58 protrude laterally outward from openings 51 (see FIG. 5) formed on the side walls of the casing 50. Each lock member 56 can be displaced between an engaged position where the engagement projections 58 are received by the slots 40 and a disengaged position where the engagement projections 58 are disengaged from the slots 40.

Each lock member 56 is provided with a rectangular protrusion 61 (see FIG. 8) protruding downward from an intermediate part (½ position) of the bottom surface with respect to the fore and aft direction. The lower case 52 is provided with two recesses 62L, 62R (see FIG. 7) at the bottom such that each recess 62 receives the protrusion 61 of the corresponding lock member 56 so as to be slidable in the lateral direction. The slidable engagement between the protrusion 61 and the recess 62 linearly guides the lateral displacement of each lock member 56 between the engaged position and the disengaged position. Thus, the linear movement of the left and right lock members 56L, 56R in the lateral direction can be performed in a reliable manner.

Each lock member 56 is provided with a pair of grooves 64 (front and rear grooves 64F, 64R) extending laterally therethrough and arranged one behind the other in the fore and aft direction and each between adjacent engagement projections 58. The bottom surface of each groove 64 forms a cam surface 66 (see FIG. 4). Therefore, the two cam surfaces 66 (front and rear cam surfaces 66F, 66R) of each lock member 56 are provided spaced apart from each other in the lengthwise direction (fore and aft direction). More specifically, each cam surface 66 is provided on the bottom surface of each groove 64 which is formed between the corresponding mutually adjoining engagement projections 58, and includes at least one inclined outer surface which is inclined outward from the upper side to the lower side thereof. The front and rear cam surfaces 66F, 66R of the lock members 56 each form a symmetrical pair which are laterally next to each other.

The lock members 56 are provided with inner side surfaces 56A that face each other in the lateral direction. A pair of compression coil springs 68 (front and rear coil springs 68F, 68R) forming a first biasing member are provided between the inner side surfaces 56A of the lock members 56 one behind the other in the fore and aft direction. Each compression coil spring 68 adjoins the corresponding groove 64 from the outside with respect to the fore and aft direction, or in other words, adjoins a plate member 88 (a front plate member 88F or a rear front member 88R, which will be described later) fitted in the corresponding groove 64 from the outside with respect to the fore and aft direction. Further, each compression coil spring 68 adjoins the front ends or the rear ends of the lock members 56. The compression coil springs 68 thus urge the lock members 56 toward the engaged position.

Since the compression coil springs 68 are positioned adjacent to the corresponding plate members 88, the lock members 56 are urged by the compression coil springs 68 in a stable manner, and the attitude of the plate members 88 is stabilized.

Each lock member 56 is provided with a pair of retainer recesses 57 (front and rear retainer recesses 57F, 57R) (see FIG. 8) that open at the inner side surface 56A thereof to receive the ends of the corresponding compression coil springs 68. The lower case 52 is provided with a pair of spring cradles 70 (front and rear spring cradles 70F, 70R) (see FIG. 7) at the bottom thereof, each provided with an arcuate upper surface that supports an intermediate part of the corresponding compression coil spring 68.

Each lock member 56 is provided with a pair of protrusions 72 (front and rear protrusions 72F, 72R) that protrudes outward in the fore and aft direction from the front and rear ends thereof, respectively. A pair of restricting plates 74 (front and rear restriction plates 74F, 74R) are positioned at the front and rear ends of the lock members 56. Each restricting plate 74 is provided with a pair of laterally elongated slots 76. Each elongated slot 76 receives the corresponding protrusion 72 in a laterally slidable manner. Each restricting plate 74 is provided with a downwardly extending tongue piece 78 which is vertically inserted into a corresponding one of engaging grooves 80 (front and rear engaging grooves 80F, 80R) formed in the bottom of the lower case 52 in a vertically removable manner.

As a result, each restricting plate 74 is detachably retained by the casing 50, and in cooperation with the protrusions 72, forms a restricting portion that restricts the laterally inward and outward movement of the left and right lock members 56L, 56R with respect to the casing 50. The restricting portion defines the engaged position and the disengaged position of the lock members 56 by restricting the limits of the lateral movement of each lock member 56.

The restricting plates 74 join the left and right lock members 56L, 56R, which are urged by the compression coil springs 68 away from each other, to each other so that the left and right lock members 56L, 56R and the compression coil springs 68 can be handled as a single module or assembly. Thereby, the left and right lock members 56L, 56R, the compression coil springs 68, and the restricting plates 74 can be assembled to the lower case 52 as a single subassembly in an efficient manner.

An operating member 86 is provided in the casing 50 so as to be displaceable in the vertical direction. The operating member 86 is an assembly of a pair of plate members 88 (front and rear plate members 88F, 88R) opposing each other in the fore and aft direction in parallel to each other and in a spaced apart relationship, and an intermediate connecting member 90 that connects the two plate members 88 to each other.

A compression coil spring 92 (see FIG. 4) forming a second urging member is interposed between a central part of the intermediate connecting member 90 which is positioned centrally of the operating member 86 and a retainer recess 82 formed at the bottom of the lower case 52. The compression coil spring 92 urges the operating member 86 upward with respect to the casing 50. Since the compression coil spring 92 is positioned such that the spring force of the compression coil spring 92 acts centrally on the intermediate connecting member 90 with respect to the lengthwise direction, the biasing force of the compression coil spring 92 is prevented from acting unevenly on the operating member 86 with respect to the lengthwise direction, so that the operating member 86 can be displaced in the vertical direction in a smooth manner.

Each plate member 88 includes a connecting portion 88A provided in a laterally central part thereof, and connected to the intermediate connecting member 90, a pair of arm portions 88B (left and right arm portions 88BL, 88BR) extending laterally outward from the connecting portion 88A, and a pair of depending portions 88C (left and right depending portions 88CL, 88CR) depending downward from the free ends of the respective arm portions 88B, all in a symmetric manner. The left and right arm portions 88BL, 88BR and the depending portions 88CL, 88CR are received in the corresponding grooves 64 of the left and right lock members 56L, 56R so as to be slidable in the vertical direction.

The depending portions 88C are provided with cooperating cam surfaces 94, so as to correspond to the cam surfaces 66, on the inner end surfaces thereof, respectively. Therefore, each of the front and rear plate members 88L, 88R is provided with two cooperating cam surfaces 94 (left and right cooperating cam surfaces 94L, 94R). Thus, the four cooperating cam surfaces 94 are located on either side of the front and rear parts of the single operating member 86 so as to correspond to the respective cam surfaces 66. Each cooperating cam surface 94 includes at least one inclined inner surface that is inclined outward from the upper side to the lower side thereof, and is configured to be in slidable contact with the corresponding cam surface 66. The cooperating cam surfaces 94 of each plate member 88 form a bilaterally symmetric pair.

Each cooperating cam surface 94 comes into contact with the corresponding cam surface 66 as the operating member 86 is pushed downward against the biasing force of the compression coil spring 92, and is slidably displaced downward with respect to the cam surface 66. Thus, the vertical displacement of the operating member 86 is converted into the lateral movements of the left and right lock members 56L, 56R so that the left and right lock members 56L, 56R are simultaneously displaced to the disengaged position against the biasing force of the compression coil springs 68.

As described above, each plate member 88 is slidably received in the corresponding groove 64, and the vertical movement thereof with respect to the lock members 56 is guided by the wall surface defining the groove 64 so that each plate member 88 is prevented from wobbling with respect to the lock members 56, and the attitude of each plate member 88 with respect to the lock members 56 is stabilized. As a result, the attitude of the cooperating cam surfaces 94 is stabilized so that the cam surfaces 66 and the cooperating cam surfaces 94 can cause the lock members 56 to be smoothly and reliably displaced to the disengaged position.

Further, the cam surfaces 66 of each of the left and right lock members 56L, 56R are provided so as to be spaced apart in the lengthwise direction, and the four cooperating cam surfaces 94 of the operating member 86 are also provided in the front and rear parts thereof so as to correspond to the respective cam surfaces 66. Thereby, each lock member 56 can be smoothly and reliably displaced to the disengaged position.

As shown in FIG. 4, the operating member 86 is provided with an inclined upper surface 88D at the base of each of the arm portions 88B of the plate members 88, and the uppermost position of the operating member 86 under the upward biasing force is defined by the abutting of the inclined upper surface 88D with a corresponding inclined lower surface 54C of the upper case 54 located at the end of each of four slots 54A formed in the upper case 54. Each arm portion 88B and each depending portion 88C are partly received in the corresponding slot 54A when the operating member 86 is located at the uppermost position.

The operating member 86 further includes a rod-shaped rod member 96 projecting centrally therefrom or from a central part of the intermediate connecting member 90 with respect to the lengthwise direction between the two plate members 88. The rod member 96 is passed through a through hole 54B formed in the upper case 54, and projects upward from the casing 50 so as to be pressed downward from the outside.

The slide lock structure 10 configured as described above can be handled as a single module so that the assembling of the slide lock structure to the slide rail device is facilitated. More specifically, one of the unique features of the slide lock structure 10 is that all of the components thereof can be packaged as a single assembly that fits within the rail 24, instead of being positioned on top of the rail 24. Further, the locked state of the slide lock structure 10 can be achieved by laterally sliding the left and right lock members 56L, 56R in the lateral direction without the need for rotational movement around a fulcrum point. As a result, the slide lock structure 10 can be minimized in size and simplified in structure so as to be compactly concealed under the seat device 12.

As shown in FIG. 1, the upper surface of the rod member 96 is in contact with an end part of an operating lever 28 rotatably attached to the base member 18 by a horizontal pivot 27. The rod member 96 can be pressed downward by rotating the operating lever 28 in the clockwise direction about the horizontal pivot 27.

In a normal state when the rod member 96 is not pressed downward, as shown in FIG. 4, the operating member 86 is in the raised position under the biasing force of the compression coil spring 92, and the left and right cooperating cam surfaces 94L, 94R are vertically separated from the corresponding cam surfaces 66 (in FIG. 4, the rear cooperating cam surfaces 66R of the left and right lock members 56L, 56R are shown).

Therefore, the left and right lock members 56L, 56R are placed at the engaged position under the spring force of the compression coil springs 68. As a result, all the engagement projections 58 of the left and right lock members 56L, 56R are received by the corresponding slots 40 formed in the left and right inner side walls 36L, 36R of the rail 24 so that the locked state is achieved, and the slider 26 is prevented from moving in the lengthwise direction of the rail 24 together with the casing 50. Thus, the seat device 12 can be fixed at any desired position in the fore and aft direction on the floor panel 16.

Since the locked state is obtained by the engagement projections 58 of the left and right lock members 56L, 56R entering the corresponding slots 40 formed in the left and right inner side walls 36L, 36R, a highly secure locking with a high mechanical strength can be achieved by using a simple structure and without the fear of causing deformation in any of the component parts as compared to the case where the locked state is obtained by engaging a latch claw with one of the teeth of the rack.

The locked state can be released by pressing the rod member 96 downward against the biasing force of the compression coil spring 92. When the rod member 96 is pressed downward, the operating member 86 is displaced downward. As a result, the four cooperating cam surfaces 94 on either side in the front and rear parts of the operating member 86 abut against the corresponding cam surfaces 66 simultaneously and are displaced downward with respect to the cam surfaces 66 so that the left and right lock members 56L, 56R are displaced to the disengaged position simultaneously or in a symmetric manner against the biasing force of the compression coil springs 68. Thus, the left and right lock members 56L, 56R can be reliably displaced to the disengaged position with a simple structure.

Once the left and right lock members 56L, 56R are both located at the disengaged position, all of the engagement projections 58 of the left and right lock members 56L, 56R are reliably disengaged from the corresponding slots 40 so that the locked state is released in a reliable manner. In the unlocked state, the slider 26 can freely move in the lengthwise direction of the rail 24 together with the casing 50 so that the position of the seat device 12 in the fore and aft direction can be changed as desired.

Since the slots 40 of the rail 24 form a part of a screw thread or a series of teeth of a worm wheel, the rail 24 can also be used for an electric slide rail device which uses an electric motor-driven male screw member or worm engaging with the slots 40, and can be applied to a slide rail device which can be commonly used for both an electrically powered slide device and a manually operated slide device.

Next, a process of manufacturing the rail 24 provided with the slots 40 will be described in the following with reference to FIGS. 9 to 12.

Figure 9A:
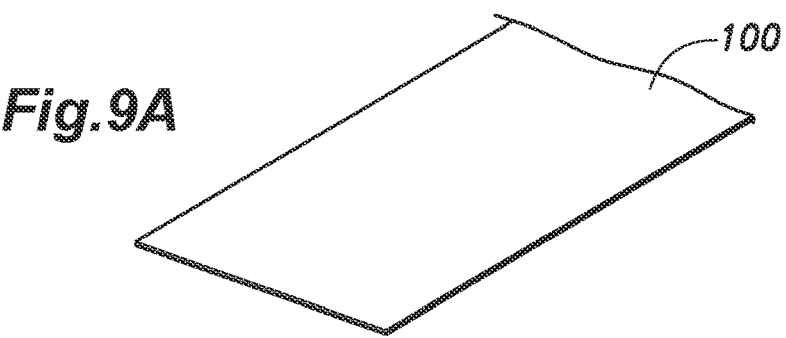
FIG. 9 is a perspective view of the material for the rail of the slide rail device according to the present embodiment, and a press forming process.
Figure 9B:
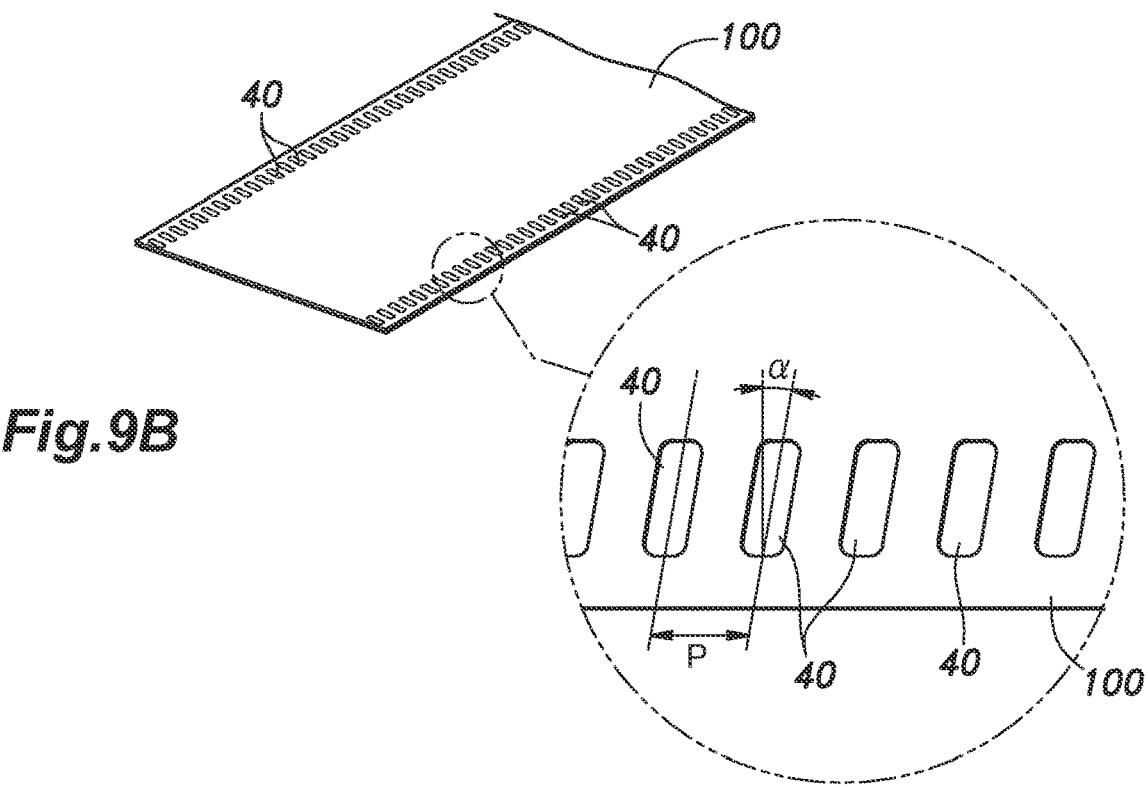

As shown in FIG. 9A, first of all, a strip of flat plate 100 made of steel is prepared as a material for the rail 24, and as shown in FIG. 9B, side edges of the flat plate 100 are punched by a punching press machine (not shown in the drawings) to form the slots (rough slots or pilot slots) at the prescribed pitch P along the length thereof Each slot 40 is inclined at the prescribed lead angle α relative to the lateral direction. The slots 40 may be formed by two for each punching stroke to reduce the press load.

Figure 9C:
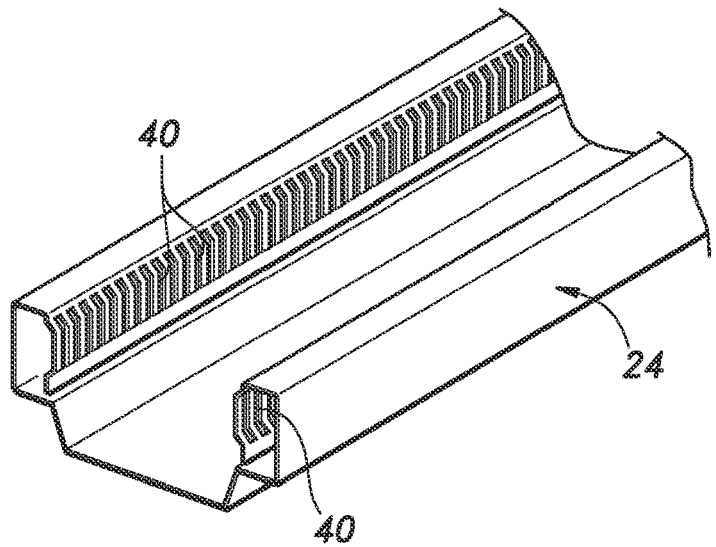

Then the flat plate 100 is bent by a bender machine (not shown in the drawings) to form the rail 24 which is bent as shown in FIG. 9C.

Figure 10:
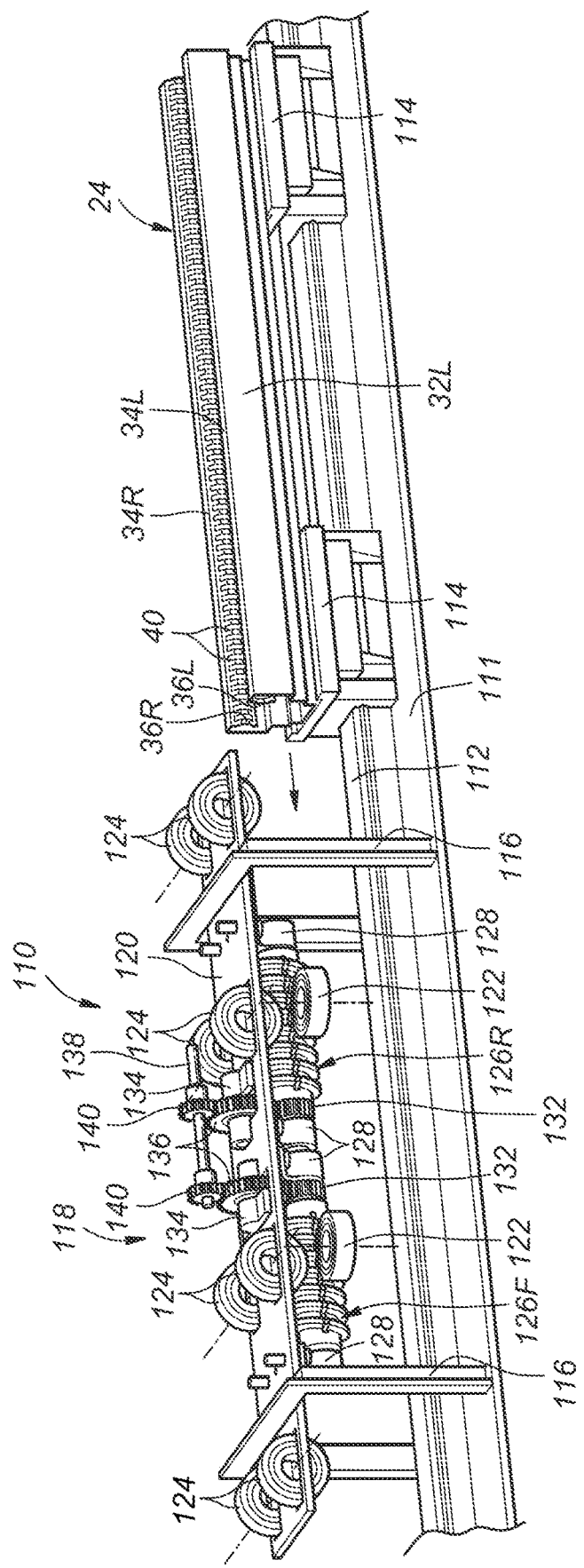
FIG. 10 is a perspective view of a rail finishing machine according to an embodiment of the present invention.
Figure 11:
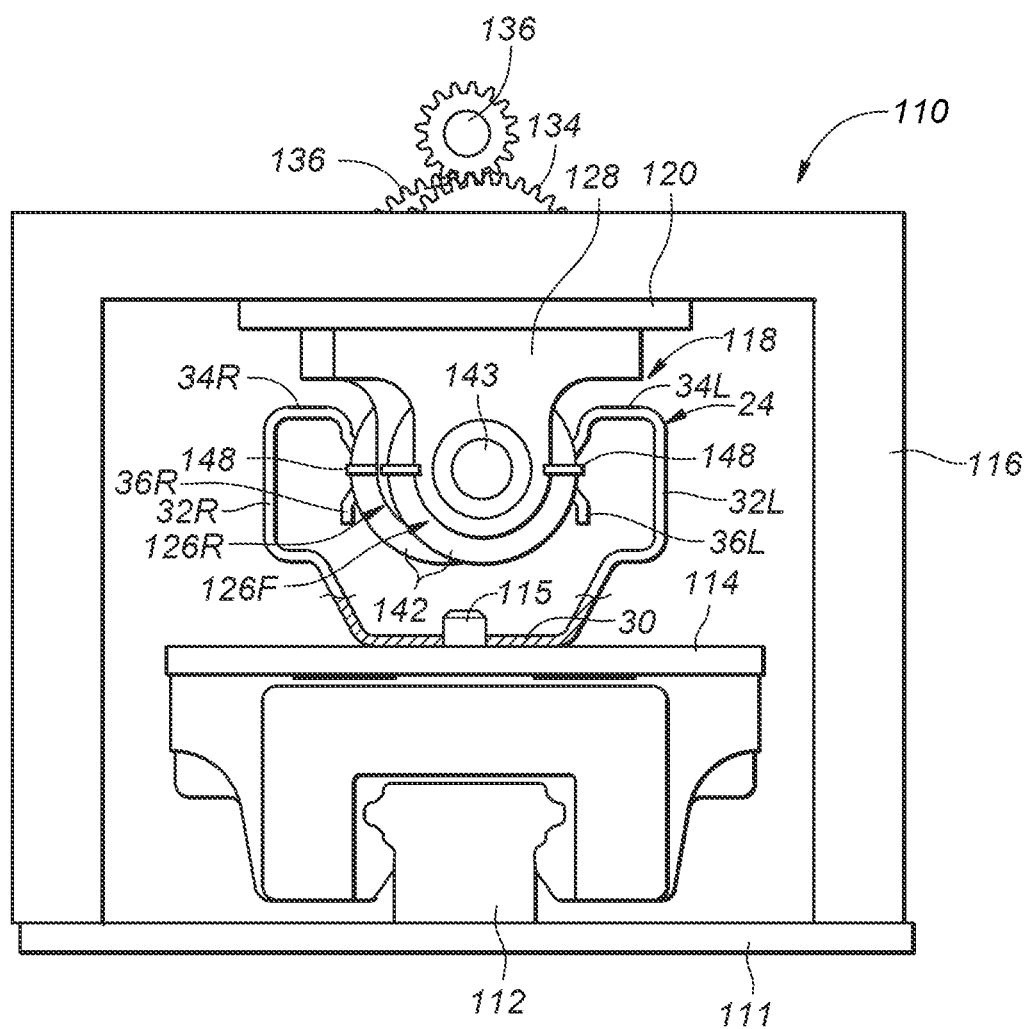
FIG. 11 is a front view of the rail finishing machine.

The rail 24 is finished by using a finishing machine 110 as shown in FIGS. 10 and 11. The finishing process of the rail 24 includes pitch correction and lead angle correction of each slot 40.

The finishing machine 110 includes a base 111, a linear transport guide rail 112 provided on the base 111, a workpiece transfer table 114 engaged with the transport guide rail 112 so as to be slidable in the lengthwise direction thereof, and a machining head 118 positioned above the base 111 by a gate-shaped gantry 116.

The rail 24 is positioned and placed on an upper part of the workpiece transfer table 114 by using positioning pins 115.

The machining head 118 includes a base plate 120, four horizontal alignment rollers 122 rotatably supported by the base plate 120 and arranged in front and rear on either side, vertical alignment rollers 124 rotatably supported by the base plate 120 and arranged in four pairs along the lengthwise direction, and a pair of finishing cutting tools 126 (front and rear finishing cutting tools 126F, 126R) rotatably supported by the base plate 120 and arranged one behind the other along the lengthwise direction.

The horizontal alignment rollers 122 rotatably contact the outer surfaces of the corresponding outer side walls 32 of the rail 24 transported by the workpiece transfer table 114, and laterally position the rail 24 with respect to the finishing cutting tools 126. The vertical alignment rollers 124 rotatably contact the upper surfaces of the left and right upper walls 34L, 34L of the rail 24, and vertically position the rail 24 (to prevent the lifting of the rail) with respect to the finishing cutting tools 126.

Each finishing cutting tool 126 is supported by a bearing mount 128 attached to the lower surface of the base plate 120 so as to be rotatable around a horizontal axis extending in the fore and aft direction. The front finishing cutting tool 126F and the rear finishing cutting tool 126R are laterally offset from each other so that the front finishing cutting tool 126F performs the finishing cut of the slots 40 on the right side of the rail 24, and the rear finishing cutting tool 126R performs the finishing cut of the slots 40 on the left side of the rail 24.

Each finishing cutting tool 126 is integrally provided with a gear 132, which will be described later. A pair of intermediate gears 136, which are rotatably mounted to the base plate 120 by respective bearing mounts 134, individually mesh with the gears 132 of the finishing cutting tools 126. The intermediate gears 136 also individually mesh with the drive gears 140 which are mounted one behind the other on a common drive shaft 138 extending in the fore and aft direction. The drive shaft 138 is connected to an electric motor (not shown in the drawings) mounted on the base plate 120, and is rotationally driven by the electric motor.

Thus, the two finishing cutting tools 126 positioned one behind the other are rotationally driven by the gear train described above in synchronism.

Figure 12A:
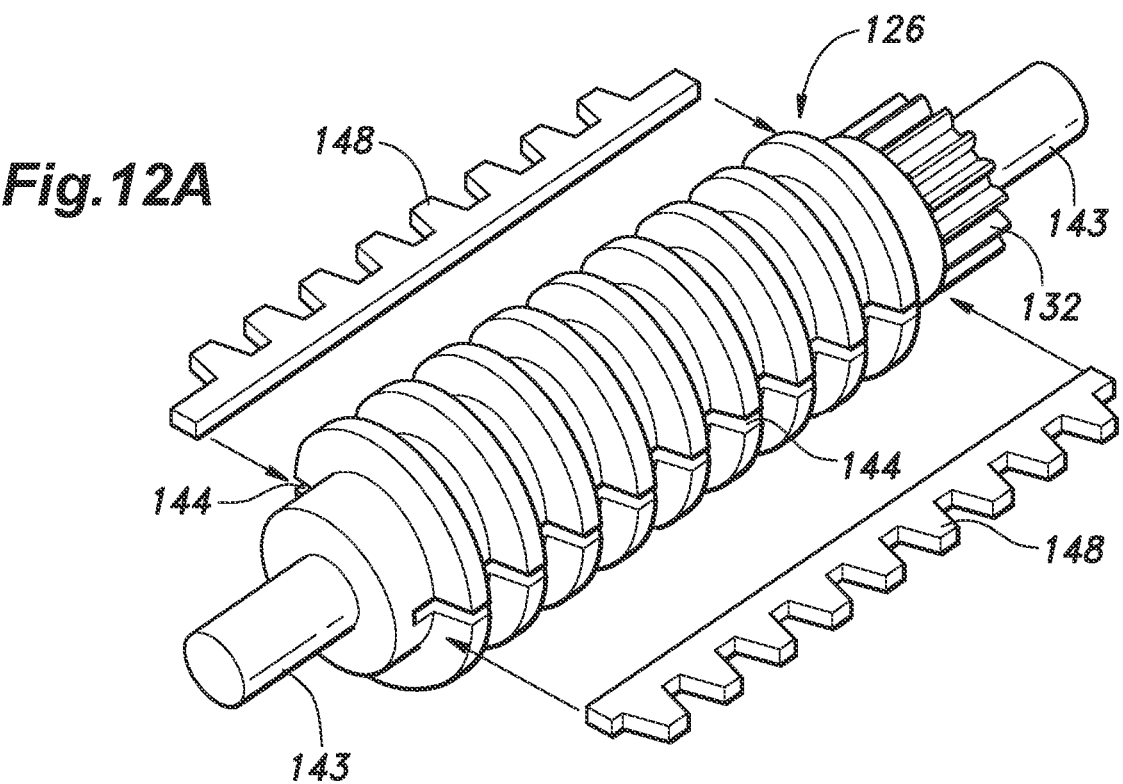
FIG. 12A is a perspective view of a finishing cutting tool for manufacturing the rail of the present embodiment.

As shown in FIG. 12A, each finishing cutting tool 126 is provided with a holder 142 having the shape of a male screw (worm-shape) having the same pitch as the pitch P and the same lead angle as the lead angle α, and a central shaft portion 143 integrally formed with the holder 142 and projecting from the front and rear ends thereof. The gear 132 mentioned earlier is integrally attached to the outer periphery of one of the projecting ends of the central shaft portion 143.

A pair of grooves 146 extending in the axial direction are formed on the outer circumference of the holder 142 at two locations rotationally displaced by 180 degrees around the central axis. A cutting blade 148 made of a comb-shaped flat plate having teeth arranged at the same pitch as the pitch P is detachably fitted into each groove 146. Each cutting blade 148 is fixed in the axial direction with respect to the holder 142 in the corresponding groove 144 so that the pitch of the teeth of the cutting blade 148 matches the pitch of the screw thread of the holder 142.

While the two front and rear finishing cutting tools 126F, 126R are rotationally driven, the rail 24 is conveyed toward the machining head 118 at a predetermined speed by the workpiece transfer table 114 so that the cutting blades 148 of the finishing cutting tools 126 perform the finishing cutting of the slots 40 in the rail 24.

Figure 12B:
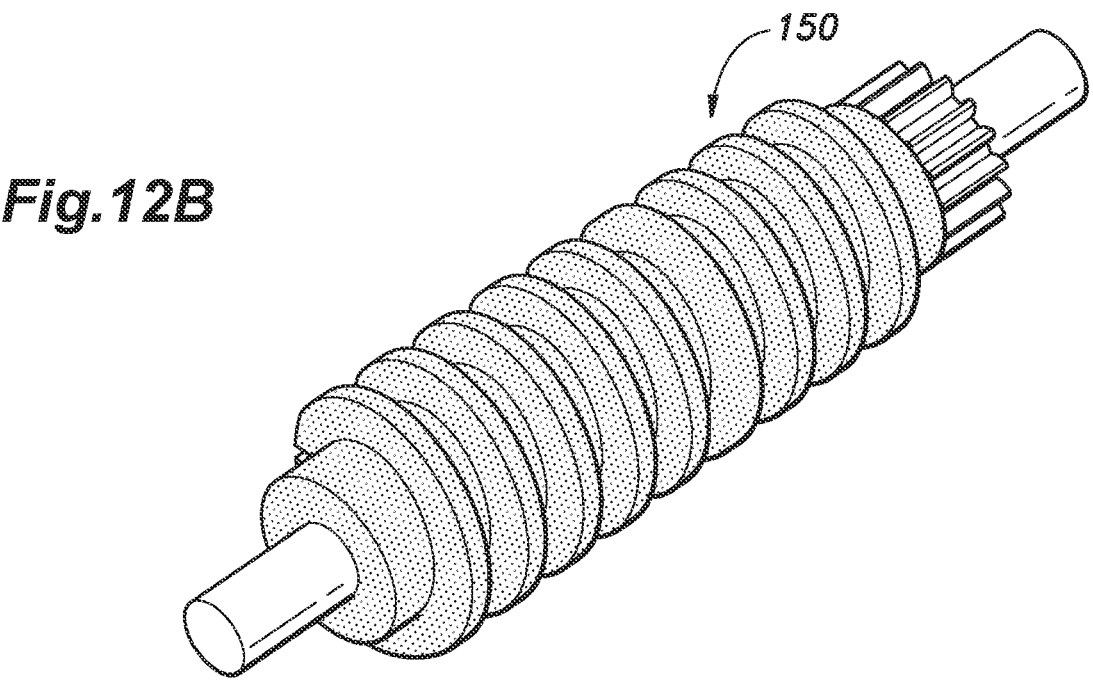
FIG. 12B is a perspective view of a finishing grinding tool for manufacturing the rail of the present embodiment; vehicle.

As another embodiment, a grinding tool 150 as shown in FIG. 12B may be attached to the machining head 118 instead of the finishing cutting tool 126 so that the slots 40 may be finished by grinding. The grinding tool 150 is formed by sintering a suitable material into a male screw shape (worm shape) having the same pitch as the pitch P and the same lead angle as the lead angle α.

Figure 13:
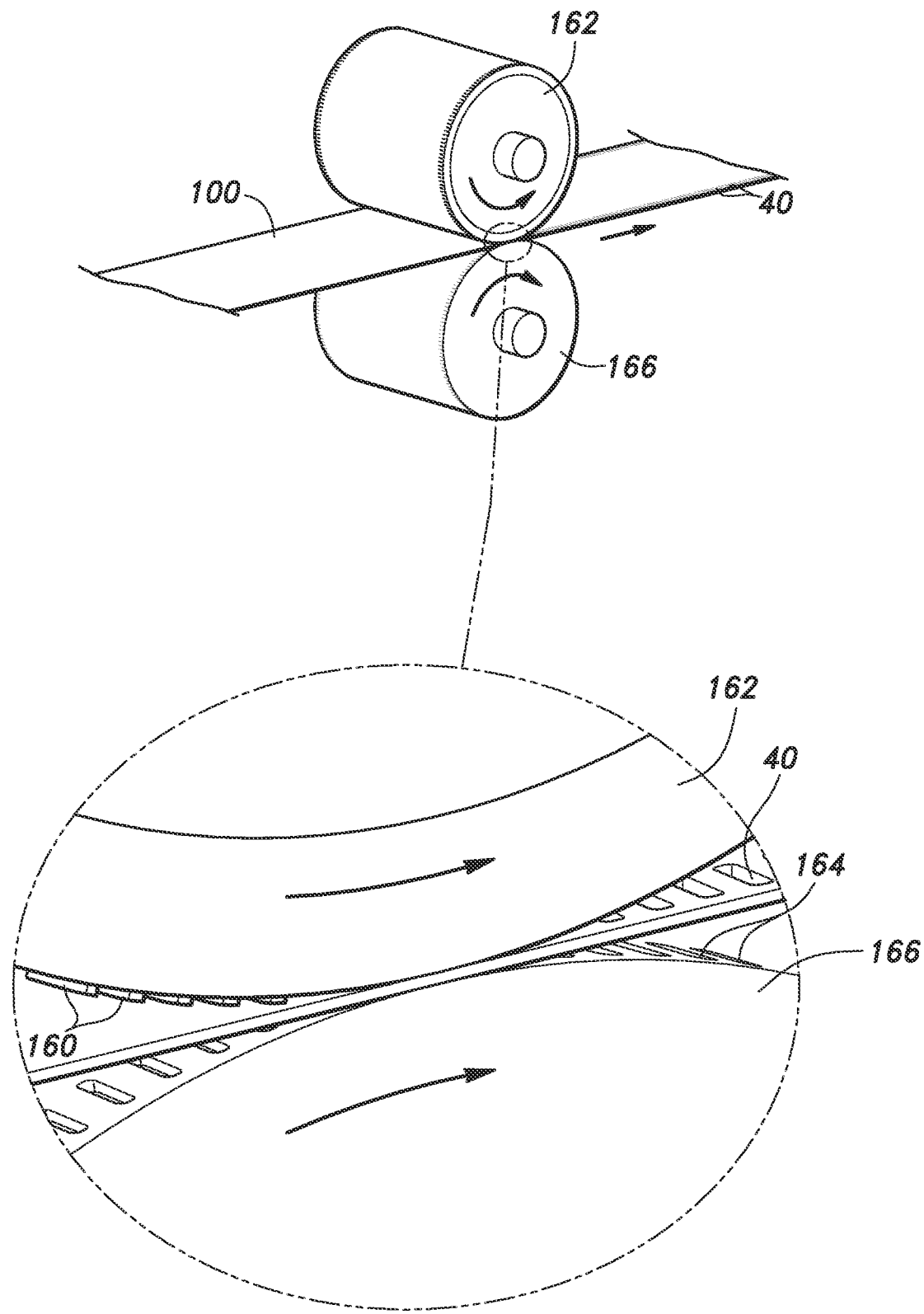
FIG. 13 is a perspective view of a rail manufacturing device according to an embodiment of the present invention.

Further, as yet another embodiment, the slots 40 may be punched out by using a roller type punch 162 provided with a plurality of punches 160 arranged on the outer peripheral surface thereof and a roller type die 166 provided with corresponding dies 164 arranged on the outer peripheral surface thereof, as shown in FIG. 13.

The present invention has been described in terms of preferred embodiments thereof, but as can be readily appreciated by a person skilled in the art, the present invention is not limited to such embodiments and can be changed in various ways without departing from the scope of the present invention.

For example, the engagement projections 58 of each of the left and right lock members 56L, 56R may also be one or more than four in number. The compression coil springs 68 may also be arranged so as to be adjacent to the plate members 88 from the inside with respect to the fore and aft direction.

The slide lock structure 10 according to the present invention is not limited to the application to the slide rail device 14 for the seat device 12, but can also be applied to the slide rail device 14 for various other devices.

In addition, not all of the components shown in the above embodiments are indispensable for the present invention, and such components can be appropriately selected and substituted without departing from the scope of the present invention.

LIST OF REFERENCE NUMERALS

| | |
|---|---|
| 10: slide lock structure | 12: seat device |
| 14: slide rail device | 16: floor panel |
| 17: slot | 18: base member |
| 20: seat cushion | 22: seatback |
| 24: rail | 26: slider |
| 27: horizontal pivot | 28: operating lever |
| 30: bottom wall | 32: outer wall |
| 34: upper wall | |
| 36: inner side wall (first side wall, second side wall) | |
| 38: protrusion | 39: opening |
| 40: slot | 50: casing |
| 51: opening | 52: lower case |
| 54: upper case | 54A: slot |
| 54B: through hole | 54c: inclined lower surface |
| 56: lock member (first lock member, second lock member) | |
| 56a: inner side surface | 57: retainer recess |
| 58: engagement protrusion | 60: groove |
| 61: protrusion | 62: recess |
| 64: groove | 66: cam surface |
| 68: compression coil spring | 70: spring cradle |
| 72: protrusion | 74: restricting plate |
| 76: slot | 78: tongue piece |
| 80: engagement groove | 82: retainer recess |
| 86: operating member | 88: plate member |
| 88A: connecting part | 88B: arm portion |
| 88C: depending portion | 88D: inclined upper surface |
| 90: intermediate connecting member | 92: compression coil spring |
| 94: cooperating cam surface | 96: rod member |
| 100: flat plate | 110: finishing machine |
| 111: base | 112: transport guide rail |
| 114: workpiece carrier | 115: positioning pin |
| 116: gate-shaped gantry | 118: machining head |
| 120: base plate | 122: horizontal alignment roller |
| 124: vertical alignment roller | 126: finishing cutting tool |
| 128: bearing mount | 132: gear |
| 134: bearing mount | 136: intermediate gear |
| 138: drive shaft | 140: drive gear |
| 142: holder | 143: central shaft portion |
| 144: groove | 148: cutting blade |
| 150: grinding tool | 160: punch |
| 162: roller type punch | 164: die |
| 166: roller type die | |

The invention claimed is:

1. A slide lock structure for a slide rail device including a linear rail extending in a lengthwise direction, and having a channel cross section including a first side wall and a second side wall that are separated from and oppose each other in a lateral direction, each side wall being provided with a plurality of slots arranged along the lengthwise direction thereof, and a slider slidably engaging the linear rail, the slide lock structure, comprising:
a casing attached to the slider and including a part located between the first side wall and the second side wall;
a first lock member and a second lock member each provided on the casing, and provided with a cam surface formed on an outer side thereof, and at least one engagement projection projecting laterally outward, the at least one engagement projection being laterally movable between an engaged position in which the at least one engagement projection is received in one of the slots, and a disengaged position in which the at least one engagement projection is dislodged from the slots;
a first biasing member urging the first lock member and the second lock member toward the engaged position; and
an operating member provided on the casing in a movable manner, and provided with a cooperating cam surface slidably engaging the cam surface such that the first lock member and the second lock member are moved to the disengaged position against a biasing force of the first biasing member as the operating member is moved in a prescribed direction,
wherein the slide lock structure further comprises a second biasing member urging the operating member upward relative to the casing,
wherein the operating member is movable in a downward direction against a biasing force of the second biasing member, and
wherein the cam surface includes an inclined outer surface inclining outward from an upper end thereof toward a lower end thereof, and the cooperating cam surface includes an inclined inner surface inclining outward from an upper end thereof toward a lower end thereof so that the first lock member and the second lock member are caused to move to the disengaged position against a biasing force of the first biasing member as the operating member is pushed downward.

2. The slide lock structure according to claim 1, wherein the at least one engagement projection of each of the first lock member and the second lock member includes a plurality of engagement projections arranged with an interval in the lengthwise direction which is an integer multiple of an interval between the adjacent slots.

3. The slide lock structure according to claim 2, wherein the inclined outer surface of each of the first lock member and the second lock member includes a pair of inclined outer surfaces arranged one behind another in the lengthwise direction in a mutually spaced relationship, and the inclined inner surface of the operating member includes two pairs of inclined inner surfaces corresponding to the inclined outer surfaces, respectively.

4. The slide lock structure according to claim 3, wherein the inclined outer surfaces of the first lock member and the second lock member are each provided on a bottom surface of one of grooves each defined between corresponding two adjoining engagement projections of the plurality of engagement projections, and the inclined inner surfaces are formed on inner end surfaces of each of a pair of plate members that are received in corresponding ones of the grooves in a vertically movable manner.

5. The slide lock structure according to claim 4, wherein the first lock member and the second lock member are provided with inner surfaces opposing each other, and the first biasing member includes a compression coil spring interposed between the opposing inner surfaces so as to be adjacent to one of the pair of plate members from outside or inside in the lengthwise direction.

6. The slide lock structure according to claim 5, wherein the operating member includes a rod member projecting upward so as to be configured to be pressed from outside in an intermediate part of the operating member between the two plate members in the lengthwise direction.

7. The slide lock structure according to claim 6, wherein the second biasing member includes a compression coil spring interposed between the casing and the intermediate part of the operating member.

8. A slide lock structure for a slide rail device including a linear rail extending in a lengthwise direction, and having a channel cross section including a first side wall and a second side wall that are separated from and oppose each other in a lateral direction, each side wall being provided with a plurality of slots arranged along the lengthwise direction thereof, and a slider slidably engaging the linear rail, the slide lock structure, comprising:
a casing attached to the slider and including a part located between the first side wall and the second side wall;
a first lock member and a second lock member each provided on the casing, and provided with a cam surface formed on an outer side thereof, and at least one engagement projection projecting laterally outward, the at least one engagement projection being laterally movable between an engaged position in which the at least one engagement projection is received in one of the slots, and a disengaged position in which the at least one engagement projection is dislodged from the slots;
a first biasing member urging the first lock member and the second lock member toward the engaged position; and
an operating member provided on the casing in a movable manner, and provided with a cooperating cam surface slidably engaging the cam surface such that the first lock member and the second lock member are moved to the disengaged position against a biasing force of the first biasing member as the operating member is moved in a prescribed direction,
wherein the casing is provided with a restricting portion that limits an outward movement of the first lock member and the second lock member relative to the casing.

9. The slide lock structure according to claim 8, wherein the restricting portion includes a pair of restricting plate members detachably retained to the casing in front of and behind the first lock member and the second lock member, a laterally elongated slot formed in each plate member, and four protrusions projecting in the lengthwise direction from end surfaces of the first lock member and the second lock member and received by corresponding laterally elongated slots.

10. A slide lock structure for a slide rail device including a linear rail extending in a lengthwise direction, and having a channel cross section including a first side wall and a second side wall that are separated from and oppose each other in a lateral direction, each side wall being provided with a plurality of slots arranged along the lengthwise direction thereof, and a slider slidably engaging the linear rail, the slide lock structure, comprising:
a casing attached to the slider and including a part located between the first side wall and the second side wall;
a first lock member and a second lock member each provided on the casing, and provided with a cam surface formed on an outer side thereof, and at least one engagement projection projecting laterally outward, the at least one engagement projection being laterally movable between an engaged position in which the at least one engagement projection is received in one of the slots, and a disengaged position in which the at least one engagement projection is dislodged from the slots;
a first biasing member urging the first lock member and the second lock member toward the engaged position; and
an operating member provided on the casing in a movable manner, and provided with a cooperating cam surface slidably engaging the cam surface such that the first lock member and the second lock member are moved to the disengaged position against a biasing force of the first biasing member as the operating member is moved in a prescribed direction,
wherein each of the first lock member and the second lock member is provided with a projection in a bottom part thereof, and the casing is provided with a pair of recesses for receiving the projections, respectively, in a laterally slidable manner.

11. The slide lock structure according to claim 1, wherein the slots in the linear rail each form a part of a female thread, and the engagement projections each form a part of a male thread configured to thread with the female thread.

\* \* \* \* \*